US007877788B1

(12) United States Patent
Topp et al.

(10) Patent No.: US 7,877,788 B1
(45) Date of Patent: Jan. 25, 2011

(54) METHOD AND APPARATUS FOR SECURING A PERIPHERAL DATA INTERFACE

(75) Inventors: Christopher Lawrence Topp, Port Moody (CA); Kevin Bradley Citterelle, Coquitlam (CA); Ngo Bach Long, Vancouver (CA); Charles Kevin Huscroft, Vancouver (CA); David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 1003 days.

(21) Appl. No.: 11/711,366

(22) Filed: Feb. 27, 2007

Related U.S. Application Data

(60) Provisional application No. 60/777,668, filed on Feb. 27, 2006.

(51) Int. Cl.
*H04L 9/32* (2006.01)
*G06F 21/00* (2006.01)
(52) U.S. Cl. .............................. 726/4; 726/17; 713/189
(58) Field of Classification Search ........................ None
See application file for complete search history.

(56) References Cited

U.S. PATENT DOCUMENTS

| 6,378,009 | B1 | 4/2002 | Pinkston, II et al. |
| 6,708,247 | B1 | 3/2004 | Barret et al. |
| 6,735,658 | B1 | 5/2004 | Thornton |
| 2002/0073340 | A1 | 6/2002 | Mambakkam et al. |
| 2003/0208698 | A1* | 11/2003 | Chou et al. .................. 713/202 |
| 2004/0003262 | A1 | 1/2004 | England et al. |
| 2005/0216685 | A1* | 9/2005 | Heden et al. ................. 711/163 |
| 2005/0251589 | A1* | 11/2005 | Wang ............................. 710/5 |
| 2006/0010285 | A1* | 1/2006 | Georgis ....................... 711/111 |
| 2006/0069819 | A1* | 3/2006 | Corbett et al. ................. 710/36 |
| 2007/0083939 | A1* | 4/2007 | Fruhauf et al. ................. 726/34 |

OTHER PUBLICATIONS

"DeviceLock®, Protecting Your Sensitive Data by Managing Peripheral Device Access", Brochure downloaded from DeviceLock web site: http://www.devicelock.com/aboutus.html on Apr. 25, 2007.
"The USB Port Protector™, Securing your endpoints with Digital Membrane™ technology", Safend web site: www.safend.com, Copyright Safend, 2004.

* cited by examiner

*Primary Examiner*—Gilberto Barron, Jr.
*Assistant Examiner*—Shaun Gregory
(74) *Attorney, Agent, or Firm*—Moser IP Law Group (57) ABSTRACT

A method and apparatus for controlling connectivity comprising a connectivity control element coupled between an interface connector and an interface circuit, and an interface controller, coupled to the connectivity control element, for authenticating a peripheral device and controlling connectivity between the interface connector and the interface circuit based upon authentication of the peripheral device.

24 Claims, 5 Drawing Sheets

METHOD AND APPARATUS FOR SECURING A PERIPHERAL DATA INTERFACE

CROSS-REFERENCE TO RELATED APPLICATIONS

This application claims benefit of U.S. provisional patent application Ser. No. 60/777,668, filed Feb. 27, 2006, which is herein incorporated by reference in its entirety.

BACKGROUND OF THE INVENTION

1. Field of the Invention

The invention relates generally to techniques for securing a computer system. More specifically, the invention is a method and apparatus for securing a peripheral data interface, such as a USB port.

2. Description of the Related Art

Recently, personal media devices such as PDAs, smart phones, digital cameras, MP3 players and others have gained wide popularity in corporate and personal environments. This has been coupled with a massive increase in the available storage capacity of both integrated memory components and a class of devices known as transient storage devices (TSDs), such as USB flash drives.

TSDs are easily connected to the peripheral interface of a networked enterprise computer and therefore pose a significant risk to corporate security, in terms of the management and protection of corporate intellectual property, network vulnerability and enforcement of other corporate policies.

One method of protecting a peripheral interface, such as a USB port, is to use a commercially available, software-based port monitor. These products provide administrated device authorization based on USB device identification, such as device class or a unique ID. However, software-based port protection is vulnerable to tampering, requires administration and maintenance, consumes computer resources, and may affect the performance of computer applications or legitimate peripheral devices. One method of reducing the administrative overhead is to use third-part web-based monitoring services which provide policy enforcement and authentication services. However, these services do not solve the fundamental limitations of software-based port protection.

Another technique for providing device authentication is presently being standardized as IEEE P1667. P1667 is intended as a standard protocol for the authentication of TSDs in host environments using lower layer authentication methods. The core requirement of P1667 is to associate a TSD to a specific organization, person, device and location. P1667 enables authentication of TSD to hosts and vice versa. Authentication is initiated by a host operating system and device functionality is "pulled" from the host. The proposed technique does not need any specific drivers or security-related executables. However, any operating-system related technique still introduces overhead, requires maintenance and is susceptible to tampering.

In view of the shortfalls of these interface security techniques, there is a need in the art for an improved tamper-resistant techniques without any additional maintenance burden or performance overhead.

SUMMARY OF THE INVENTION

The invention is a method and apparatus for controlling connectivity comprising a connectivity control element coupled between an interface connector and an interface circuit, and an interface controller, coupled to the connectivity control element, for authenticating a peripheral device and controlling connectivity between the interface connector and the interface circuit based upon the authenticity of the peripheral device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
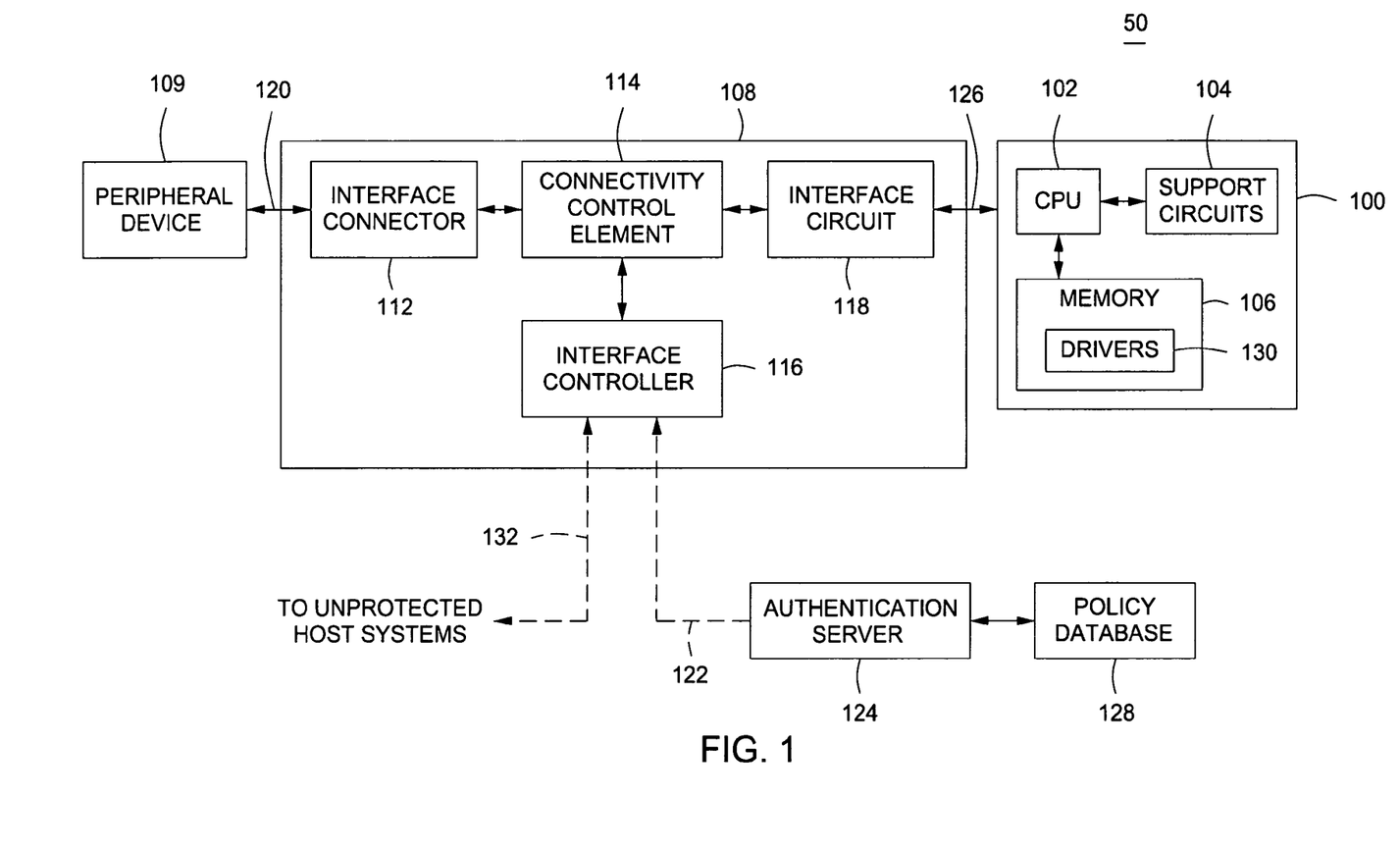
FIG. 1 depicts a high-level block diagram of a host system comprising a securable peripheral data interface of the present invention.

FIG. 1 depicts a computing environment 50 comprising a host system 100 and a securable peripheral data interface 108 (also referred to herein as a peripheral data port). A peripheral device 109 may be selectively coupled to the peripheral data interface 108 via a physical or wireless connection. The peripheral device may be a keyboard, mouse, external memory, printer, scanner, transient storage device (TSD) and the like. One example of a host system 100 is a personal computer; however, embodiments of the present invention may be used in any electronic device having an interface (port) that is capable of providing unauthorized access to a host system, such systems may include, but are not limited to, server computers, video game consoles, personal digital assistants (PDAs), cellular telephones, and the like.

The host system 100 comprises a central processing unit (CPU) 102, support circuits 104, and memory 106. The CPU 102 may comprise one or more microprocessors or microcontrollers that can be used for executing instructions to provide functionality of the host system 100. The support circuits 104 comprise well-known circuits that facilitate operation of the CPU 102. Such support circuits include, but are not limited to, at least one of cache, power supplies, clock circuits, display drivers, and the like. In an embodiment that uses a bridged host controller (as described in FIG. 4), support circuits 104 further comprise a bridged host controller circuit, also described in FIG. 4. The memory 106 may comprise at least one of random access memory, read only memory, a disk drive, removable storage, optical storage, and the like. The memory 106 stores various application programs including drivers 130 for the various peripheral devices that are intended to cooperatively operate with the host system 100.

The securable peripheral data interface 108 comprises at least one interface connector 112, a connectivity control element 114, an interface controller 116, and an interface circuit 118. The interface connector 112 comprises at least one standard multi-pin connector for coupling the host system 100 to a peripheral 109. Such a connector may be a Universal Serial Bus (USB) connector, a Firewire connector, an Ethernet connector, IEEE 1394 and the like. In a peripheral device comprising a bus, the peripheral bus 120 (e.g., a USB device) is coupled to the connector 112. In some embodiments, multiple interface connectors (only one of which is shown as connector 112) are used to connect to a single host system 100. In such embodiments, the interface circuit 118 comprises a multi-port hub. In the embodiment described below, a peripheral bus 120 couples the peripheral device 109 to the host system 100 and comprises a USB 2.0 bus, but other USB embodiments such as USB 1.1, wireless USB and the like can benefit from using embodiments of the invention.

The connectivity control element 114 interrupts the electric connection between the interface connector 112 and the interface circuit 118 until the peripheral device 109 has been authenticated. Note that in an exemplary embodiment, device authentication comprises authorizing the device for host system connection by validating device identification information against a connection policy. One example of a connection policy is a list of authorized devices. In one embodiment, the connectivity control element 114 operates as a single pole, double throw switch initially coupling the connector 112 to the interface controller 116 for authentication of the device 109. The interface controller 116 comprises circuitry, as discussed below, for authenticating the peripheral device 109, i.e., the interface controller 116 comprises an appropriate termination for the device. Upon authentication, the interface controller 116 enables the connectivity control element 114 to couple the interface connector 112 to the interface circuit 118. Once connected to the peripheral device 109, the interface circuit 118 operates in a conventional manner to facilitate use of the peripheral device 109 by the host system 100. If multiple interface connectors 112 are used, then the connectivity control element 114 is positioned between the hub and the interface connectors 112.

The securable peripheral data interface 108 enables out-of-band (OOB) management of the interface using the interface controller 116 to perform authentication of the peripheral device 109. In this manner, the interface controller 116 is coupled in parallel with the "conventional" path for the peripheral device connection to the host system 100; hence, the interface controller 116 is deemed to be out-of-band. As such, control of the securable peripheral data interface 108 is independent of the host system computing functions. The securable peripheral data interface 108 operates by isolating host system 100 from the peripheral device 109 prior to authorization. When a device is connected to the interface connector 112, a change in device state is detected. The specific state change depends upon the type of interface being monitored. In general, the connection of a peripheral device causes some form of indicia of connection to be generated. For a USB peripheral device, an impedance change is detected as an indicia of connection and the interface controller 116 initially interacts with the USB device in a conventional manner, i.e., identifying a device type and other bus related information. Thereafter, the controller 116 traps the connection event responses provided by the USB device. Information in the trapped responses is used to authenticate the device. As such, separate OOB management (i.e., interface controller 116 that is not in the path to the host system 100) is utilized for generating indicia of authentication for the connected device 109.

Once a device 109 is authenticated, the connectivity control element 114 provides a connection between interface circuits 118 and the interface connector 112 establishing a transparent connection between the peripheral device 109 and the host system 100 until the device 109 is disconnected.

The securable peripheral data interface 108 may utilize the interface controller 116 to optionally provide for management of peripheral device connectivity policy enforcement.

In one exemplary embodiment used to establish peripheral connectivity policy, the interface controller 116 communicates across a local management bus 122 to a local authentication server 124. In such an embodiment, a standard management bus such as SMI or $I^2C$ provides an effective transport layer and the authentication server 124 is a host independent processing module such as a baseboard management controller (BMC) or other security controller. In an alternative embodiment, the interface controller 116 provides a connection with a remote authentication server 124 using a standard IP connection, either over a wired link such as Ethernet or using a wireless protocol.

Whether the authentication is performed locally or remotely, the authentication process is policy driven such that a peripheral device that does not conform to a specific profile is not permitted access to the host system 100. In this manner, unauthorized I/O is prevented. For example, a port that is only to be used for an input peripheral such as a keyboard or mouse, cannot be used to extract information from the host into, for example, a TSD or other storage device. The policies for peripheral authentication can be user based, host system based, and the like. Various levels of peripheral use can be established.

In another embodiment, the controller 116 may also include one or more unprotected data connections with one or more unprotected host systems through path 132. As such, the securable peripheral data interface 108 can utilize unprotected services to validate users or provide other security-related services. In one embodiment, the peripheral device is a smart card reader and the unprotected connection is coupled to a smart card user identification database. In such an arrangement, the reader is authenticated and then the smart card information is sent to the smart card database via the unprotected connection. If the user is validated, the securable peripheral data interface 108 couples the user to the host system 100.

In one embodiment of the invention, the host system 100 may be coupled to the securable data interface 108 via path 126 using a local system bus such a PCI Express bus or other system bus. In an alternative embodiment, the connection from system 100 to data interface 108 is a networked connection such that the host system 100 is remote from the data interface 108. For example, path 126 may be an IP LAN interconnect.

In one embodiment of the present invention, an authentication server 124 provides peripheral device authentication functions. Device authentication may be based on device class, subclass, a user ID, unique device ID, endpoint type or other identification means and may not require a comprehensive device driver to support the peripheral bus interface. Rather, a partial device driver may be sufficient to negotiate the low level device authentication information. Authentication may also be applied based on other peripherals or system information, such as other policy information stored in a policy database 128.

In an alternative embodiment, authentication server 124 also provides policy enforcement functions. These may include the exchange of audit data with securable peripheral data interface 108. Such data may include traffic statistics, confirmation of device or traffic attributes or instructions to change connection attributes or even disable host interconnect path 126.

Regulation of peripheral devices may be of any type including user based, traffic based, peripheral-type based, bandwidth constrained, data transfer type regulated and so on. For example, a policy may be established that no user may attach a TSD to a computer. As such, TSDs would not be authorized. Such restriction can be established on a user-by-user basis or on a employment level basis, i.e., managers can use TSDs, but staff members cannot use TSDs. In other policies, the amount of storage of the TSD may be limited or storage other than a TSD may be blocked such that disk drives cannot be connected.

In one embodiment of the invention, an attempt to reach a policy or attach an unauthorized or unauthentic peripheral device may be reported by the authentication server 124 to a system operator, security professional or other authority figure.

In one embodiment of the invention, host system 100 is a local host processor, chipset and associated memory infrastructure, e.g., a standard personal computer CPU, support circuits and memory. In this case, host system 100 includes drivers 130 for the securable peripheral data interface 108 in addition to standard peripheral device drivers. In an embodiment, the drivers 130 for securable peripheral data interface 108 are industry compliant Open Host Controller Interface (OHCI) USB host controller drivers (HCD), i.e., the host drivers 130 are not altered to support the invention. In other embodiments, the drivers 130 are industry compliant Enhanced Host Controller Interface (ENCI), Universal Host Controller Interface (UHCI) or combinations such as OHCI/EHCI drivers.

In another embodiment, the host system 100 is remotely located as is the case with a blade personal computer system with remote networked user interface capabilities. In this embodiment, the USB controller (interface circuit 118) is bridged across the network and securable peripheral data interface 108 presents the same driver interface to host system 100 as if the peripheral device interface were local. In this embodiment, the drivers 130 for securable peripheral data interface 108 may also be standard and unmodified USB HCD drivers.

In another embodiment, host system 100 is a remote server system and securable peripheral data interface 108 provides a comprehensive set of host controller functions for peripheral bus 120. In such an embodiment, high level peripheral function commands are communicated between host system 100 and securable peripheral data interface 108 across host interconnect path 126 that requires software drivers 130 on host system 108 capable of the high level I/O command transfers. Examples of higher level command protocols include T.120, Microsoft Remote Desktop Protocol (RDP), Citrix ICA, USB Request Block (URB) protocols and the like.

Figure 5:
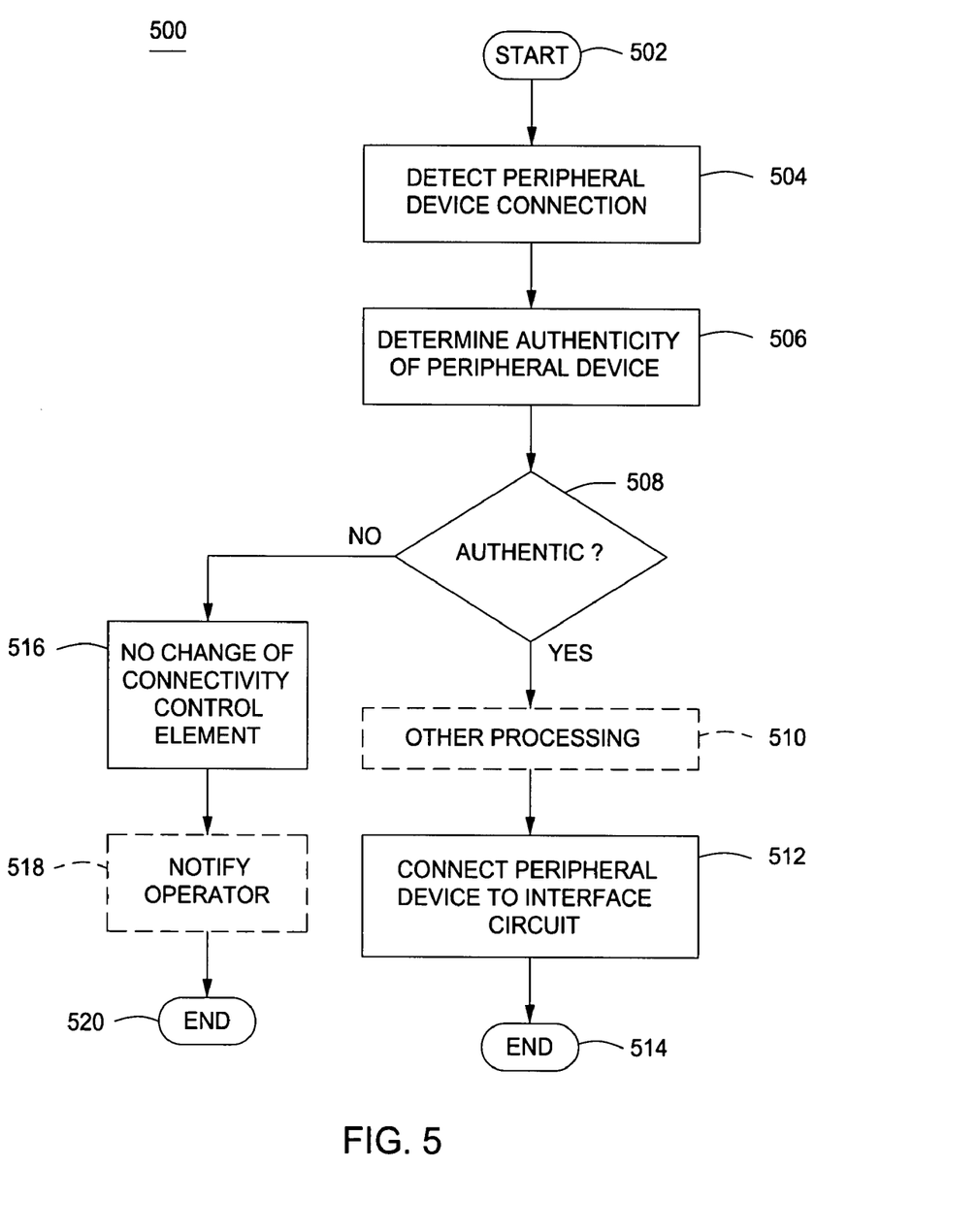
FIG. 5 depicts a flow diagram of a method of operation of one embodiment of the invention.

FIG. 5 depicts a flow diagram of a method 500 of operation of the embodiment of the securable peripheral data interface 108 of FIG. 1. The method 500 begins at step 502 and proceeds to step 504. At step 504, the method 500 detects the connection of the peripheral device to the interface connector, e.g., for a USB device, the indicia of connection is an impedance change in the interface connector that is detected by a USB controller within the interface controller. Generally, a state change for the interface connector forms an interrupt that launches the method 500.

At step 506, the method 500 determines whether the peripheral device is authentic. For a USB device, the device driver request (e.g., a request for a plug-and-play driver) is trapped and analyzed to determine the device type and/or other device related information. Device-related information includes USB Device ID, USB Vendor ID and bus-related information such as bus instance ID, bus hardware ID and bus compatibility ID. At step 508, the method 500 queries whether the device is authentic. If the query is negatively answered, the method 500 proceeds to step 516 where no change of the connectivity control element is performed, i.e., the peripheral device is denied access to the host system. At step 518, the method 500 may perform an optional step to notify an operator (or other designated person) that an unauthorized peripheral device attempted access to the host system. The method ends at step 520.

If the query at step 508 is affirmatively answered, the method 500 proceeds to step 510 to optionally perform other processing, e.g., policy compliance analysis, security compliance analysis, non-secure host processing, user verification, bio-metric data analysis, and the like. At step 512, assuming the results of the "other processing" permits; the method 500 connects the peripheral device to the interface circuit and ends at step 514. Once connected to the interface circuit, the peripheral device operates with the host system in a conventional manner. If the peripheral device is disconnected, the connectivity control element disconnects the interface connector from the interface circuit. In an embodiment, the connectivity control element disconnects the interface controller if a policy violation such as excess bandwidth consumption or audit failure is detected.

Figure 2:
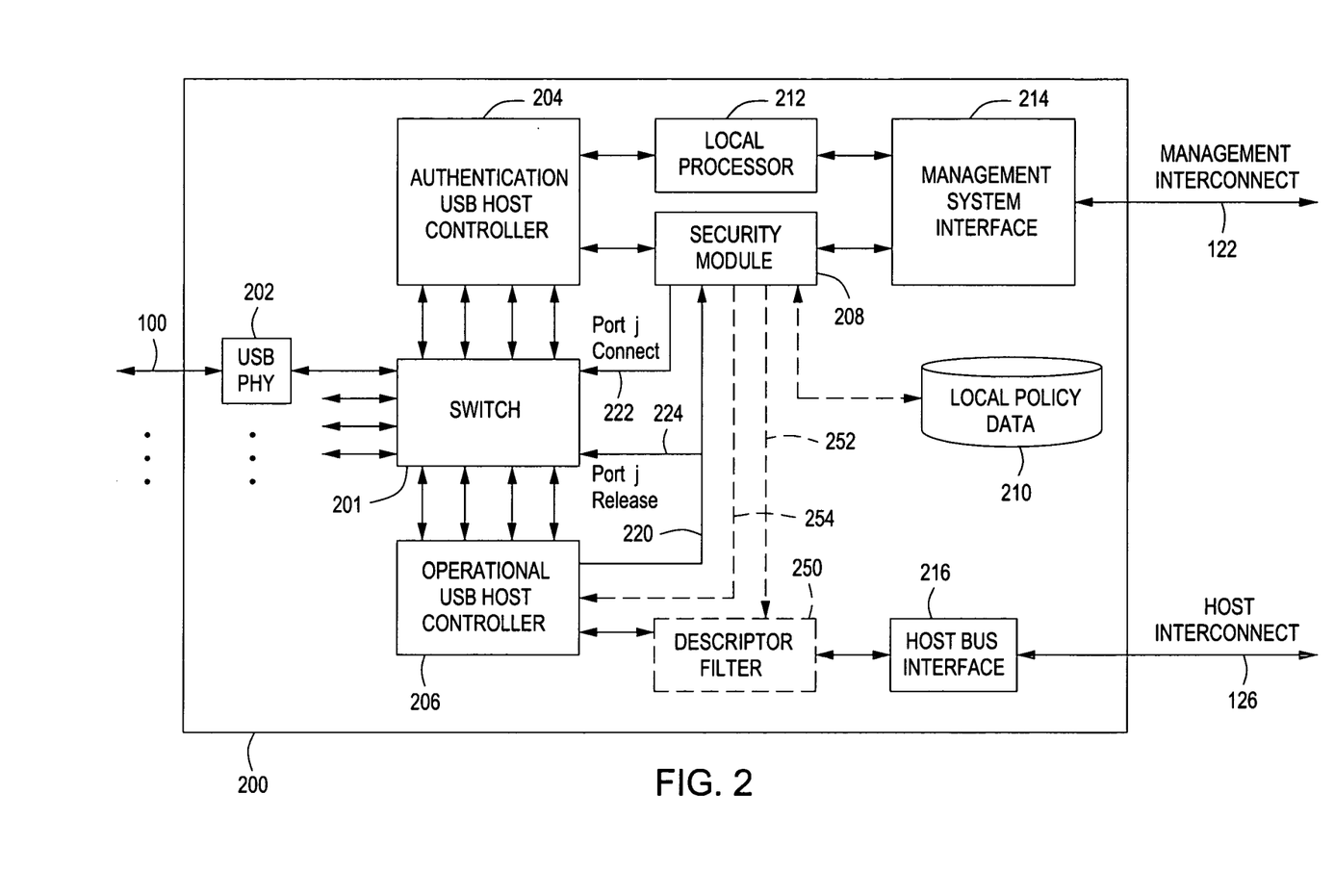
FIG. 2 depicts the architecture of a securable USB Interface supported by a local host system.

FIG. 2 depicts a detailed block diagram of the architecture of a securable USB interface module 200 that forms one embodiment of securable peripheral data interface 108 of FIG. 1. This architecture forces a USB peripheral device to be electronically isolated from a host system until the device has been authenticated. By default, the USB interface PHY 202 is connected to an authentication host controller (AHC) 204 by a switch 201 (in the depicted embodiment a multi-port SPDT switch is shown). Once a connected USB peripheral device on one of the ports has been authenticated, the PHY 202 is connected to an operational host controller (OHC) 206. The PHY connection reverts back to the AHC 204 whenever a peripheral device is disconnected.

In the embodiment of FIG. 2, AHC 204 and OHC 206 each incorporate a root hub with four ports such that the switch 201 is capable of independently controlling each of four PHYs 202 by detecting connected devices and switching them between AHC 204 and OHC 206. Other embodiments with different root hub configurations such as more or fewer ports are also contemplated. In the embodiment shown, AHC 204 is an OHCI host controller with USB 1.1 capabilities while OHC 206 is a USB 2.0 capable OHCI/EHCI controller. In other embodiments, AHC 204 may support EHCI devices or OHC 206 may be limited to supporting OHCI only. A UHCI-capable embodiment is also contemplated.

The default state for each connection (e.g., after system reset) is an active connection between PHY 202 and AHC 204. Switchover from AHC 204 to OHC 206 is activated by security module 208 while switch release from OHC 206 back to AHC 204 is activated by disconnect signal 220 originating from OHC 206. The disconnect signal 220 is triggered by the physical disconnection of a peripheral device (or power removal in the case of some self-powered devices) that causes a USB SE0 condition on USB bus 120. Once an SE0 state persists for longer than 2.5 uS, the disconnection is detected and OHC 206 activates disconnect signal 220.

In one embodiment, AHC 204 is an industry-compatible USB host controller module as is known to the art. In an alternative embodiment, AHC 204 provides the minimum functionality necessary to support the authentication of a peripheral device. AHC 204 includes a USB state controller such as the one specified by the Open HCI specification, list processor and operational registers, a host controller communication area (HCCA), a root hub and serialization hardware.

In one embodiment, the security module 208 operates in a local mode where decisions regarding peripheral device authenticity are performed locally within the interface 200. In another embodiment, the security module 208 comprises a security manager that manages communications between securable peripheral data interface 200 and authentication server 124 in FIG. 1. It is assumed that management system interface 214 establishes a secure connection to authentication server 124 for integrity of the system and security module 208 uses this connection.

Authentication methods include device authentication and optional user authentication based on information stored in policy database 128 as described. In an alternative embodiment, policy information is retrieved from locally stored policy database 210 which provides a predefined list of policies. Policy database 210 may be accessible from authentication server 124 and updated after initialization or periodically, enabling offline authentication of peripheral devices in cases where management interconnect path 122 is a network connection subject to disconnection.

In an embodiment, security module 208 provides an additional device authorization filter based on knowledge of dynamic system state. As one example, security module 208 allows configurations with a limited set of operational USB flash drives at any one time. As a second example, the combination of devices using different data transfer types may be restricted. As another example, only input devices such as a keyboard or mouse are supported until a connection to authentication server 124 is established.

The USB authentication state machine governing port management and control of the switch 201 is controlled by a USB management function within security module 208. The USB authentication state machine is shown in state diagram of FIG. 3 and described below.

The local processor 212 executes a limited USB device driver and provides sufficient device enumeration to query device class and capabilities. The local processor 212 is capable of resetting peripheral device 109 and reading descriptors such as device, configuration and subordinate descriptors. In an embodiment, the local processor 212 also supports full enumeration of some input devices such as devices with limited capability such as a mouse or keyboard which may in turn be used for identification to the authentication server (e.g. using a keyboard to enter a password).

The Management system interface 214 provides a local management bus or network interface to the authentication server or other services.

In one embodiment, the OHC module 206 has a standard USB host controller structure similar to that described for the AHC 204. However, the OHC 206 has the functionality required to process descriptor lists at rates specified by the USB specification. The OHC 206 also has additional features, including a disconnect detection signal 220. In one embodiment, the disconnect signal 220 is routed to the security module 208 which in turn releases a connection using a port release signal 224. In an alternative embodiment, the OHC signals the switch 201 directly and provides status notification to the security module 208.

In an embodiment, the host bus interface 216 is an industry-compliant system bus interface, e.g., a peripheral component interconnect (PCI) bus or PCI Express interface. In an alternative embodiment, the host bus interface 216 is a network interface such as an Ethernet interface.

Figure 3:
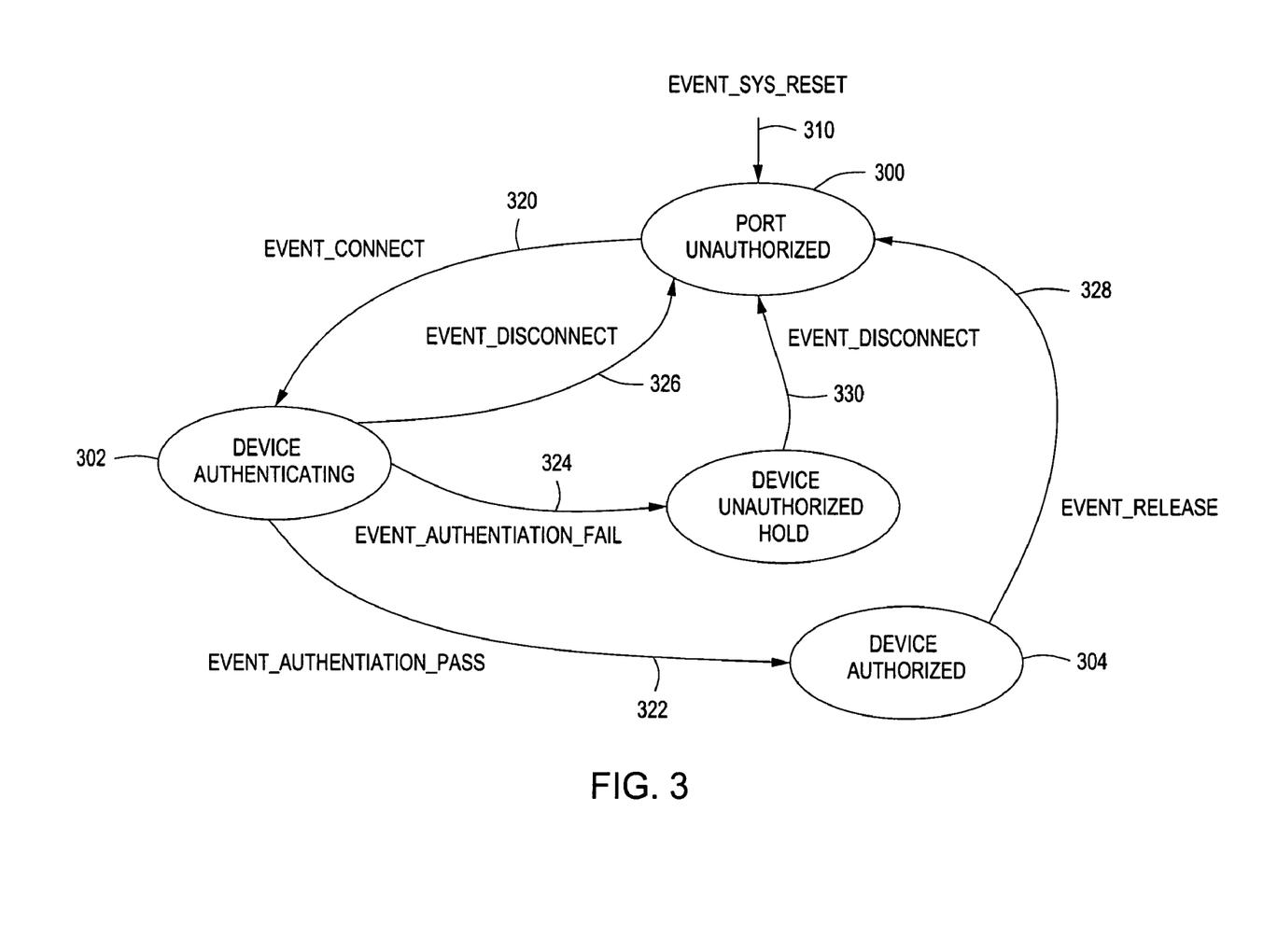
FIG. 3 depicts a diagram of a state machine governing the state of a port under control of a security module.

FIG. 3 depicts a diagram of a state machine governing the state of a port under control of the security module 208, where the term "port" as described herein refers to the external USB interface presented by the USB PHY 202. Each port of securable peripheral data interface 108 transitions between the states described by FIG. 3 as determined by predefined events that initiate transition from one state to another. Table 1 describes a set of predefined events that force state transitions.

TABLE 1

Port State Transition Event Descriptions

| EVENT_ | Causes |
|---|---|
| Sys_Reset (310) | System Initialization or reset (e.g. Reset by HCD) |
| Connect (320) | Recently connected or powered device is enumerated to reach "Default Address" state such as defined by the USB specifications |
| Disconnect (326, 330) | Device disconnection detected by AHC 204 as defined by USB specifications A device may be disconnected before the authentication negotiation is complete. An unauthorized device that has previously failed an authentication negotiation may be electrically disconnected |
| Authentication_Pass (322) | Authentication server 124 signals the authorization of peripheral device 109 |
| Authentication_Fail (324) | Authentication server 124 signals that peripheral device 109 is not authorized for connection |
| Release (328) | Device Disconnection signal from OHC 206 (For example, a signal from OHC 206 that a device has been disconnected, a policy violated or a change in user or authorization profile) |

The events described in Table 1 cause state transitions as described by Table 2. Table 2 shows current state, transition events, next states and actions taken by security module 208 before a state transition. Table 2 includes reference numbers to associated states and transitions in FIG. 3.

TABLE 2

State Transition Table

| Current State | EVENT_ | Next State | Action |
|---|---|---|---|
| Undefined Port Unauthorized (300) | Sys_Reset (310) Connect (320) | Port Unauthorized Device Authenticating | |
| Device Authenticating (302) | Authentication_Pass (322) | Device Authorized | Switch port to OHC |
| | Authentication_Fail (324) | Device Unauthorized Hold | |
| | Disconnect (326) | Port Unauthorized | |
| Device Authorized (304) | Release (328) | Port Unauthorized | Switch port to AHC |
| Device Unauthorized Hold (306) | Disconnect (330) | Port Unauthorized | |

In Table 2, the authentication_pass signal 322 switches a port from the AHC 204 to the OHC 206, while the release signal 328 switches the connection back from the OHC 206 to the AHC 204.

To prevent the connection of an unauthorized device during the moment of transition from the AHC to the OHC (i.e., during transition from state 302 to state 304), a physically secure handover of an authenticated device should be conducted. As such, both the AHC 204 and the OHC 206 are not simultaneously disconnected, allowing for an undetected illegal insertion and consequent device authorization.

In one embodiment, power to the OHC 206 is applied before the AHC 204 releases the device. The OHC connection is signaled to the AHC before device authorized state 304 is entered. If a device is substituted, an EVENT-Disconnect 326 is triggered and the port returns to port unauthorized state 300. In another embodiment, the PHY detects a signal loss and signals the OHC 206 that the device should be immediately released (event 328) and the port returned to port unauthorized state 300.

In one alternative embodiment, device re-authorization is also enforced based on policy change events. In such an embodiment, a state transition from "Device Authorized" 304 in FIG. 3 to "Device Unauthorized Hold" 306 in FIG. 3 is forced in the event of a policy change. If the device meets the new policy, a transition from "Device Unauthorized Hold" 306 back to "Device Authorized" 304 occurs.

In an embodiment, the state transitions for each of the ports of securable peripheral data interface 108 described is governed by an independent state machine.

The security module 208 provides methods for configuring the USB state controller of the OHC 206 using a device policy configuration signal 254. In one embodiment, the device policy configuration signal 254 is a read/write-accessible register interface to configuration and operational registers of the OHC 206. As one example of state controller configuration, the security module 208 provides active bandwidth management through the prioritization of reclaimed bandwidth between competing peripherals. As a second example, the security module 208 performs active enquiry of device qualifications. In one embodiment, the security module 208 periodically requests device descriptor information such as device class or subclass, etc. In another embodiment, device descriptor information is requested after a wake-up event.

In one embodiment, the security module 208 provides active intervention when violating devices are detected. For example, the device policy configuration signal 254 may force the premature termination of a transfer or endpoint descriptor. As another example, the release of a port may be forced.

In an alternative embodiment, the securable peripheral data interface further comprises policy enforcement capabilities that are applied after a peripheral device has been authenticated. In such an embodiment, a descriptor filter 250 is (shown in phantom in FIG. 2) coupled between the host bus interface 216 and the OHC 206. The descriptor filter 250 is supplied with audit information via path 252 from the security module 208.

The security module 208 executes additional policy enforcement procedures for controlling peripheral device functionality after the peripheral device has been connected. The descriptor filter 250 facilitates monitoring of authenticated USB traffic between the OHC 206 and the host bus interface 216. The security module 208 allows dynamic prioritization and reallocation of reclaimed bandwidth for bulk transfers. In one embodiment, transfer descriptors associated with higher priority endpoint descriptors receive priority processing. The security module 208 is capable of monitoring device bandwidth usage, interrupts or other indicators of bus activity. For example, the actual usage profile of a device may be compared with a standard profile for that type of device retrieved from remote policy database 128 or local policy database 210.

The descriptor filter 250 performs active monitoring of USB traffic on connection between the OHC 206 and the host bus interface 216. In one embodiment, the descriptor filter 250 incorporates a programmable packet inspection module under control of the security module 208. In this embodiment of the invention, an audit information signal 252 is read by the security module 208. One example of useful audit information is endpoint descriptor information that describes the size of transfers to a determined endpoint. Another example of useful audit information is the polling interval for different endpoints of a device. Whenever the security module 208 detects inappropriate activity, the connection to the peripheral device can be severed.

Figure 4:
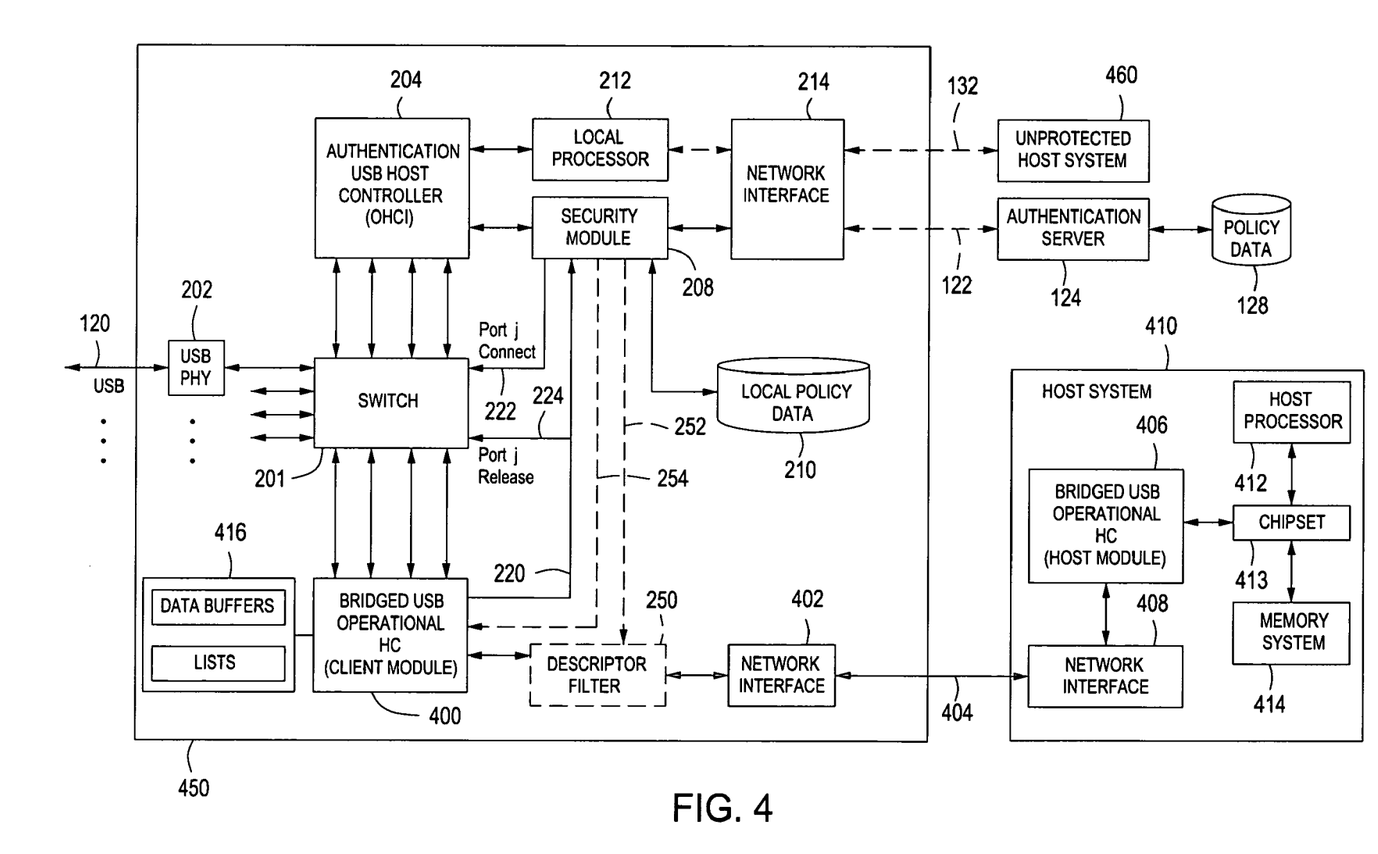
FIG. 4 depicts the architecture of a securable-bridged USB interface supported by a remote host system.

FIG. 4 depicts a block diagram of another architecture for a securable USB interface. The securable peripheral data interface 450 shown is an embodiment of securable peripheral device interface 108 that is connected to a remote host system 410. In the embodiment, the OHC host controller function is bridged across a network 404 by using a bridged OHC client module 400 to communicate with a peer bridged OHC host module 406 of the host system 410. (Host system 410 is an embodiment of host system 100 in FIG. 1 that includes the bridged OHC host module 406.)

The bridged OHC client module 400 uses a network interface 402 to enable a bridged connection 404 with the bridged OHC host module 406 and the associated network interface 408 of the host system 410.

The detailed structure of one example of a bridged USB host controller is described in U.S. patent application Ser. No. 11/549,055, filed on Oct. 12, 2006, which is incorporated herein by reference herein in its entirety. Other forms of bridging may be used in conjunction with the securable peripheral data interface of the present invention.

In the exemplary bridging technique, at one layer, the bridged OHC client module 400 and the bridged OHC host module 406 exchange inbound or outbound USB data streams by maintaining synchronization between data buffers and descriptor lists in the host memory system 414 and data buffers and lists in the bridged OHC client module memory system 416 using transfer management modules within each of the OHC modules. Network and lower layer communications are managed by a pair of network interface modules 402 and 408 located at either end of the system.

List processor and transfer management modules of the bridged OHC client module 400 maintain bidirectional links with equivalent function modules in the bridged OHC host module 406. Various update packets including list, operational register and data update packets are transferred between the two sides of the network using underlying network interfaces with each module transferring specific update information back to the opposite end of the link based on host or client initiated changes to the descriptor lists or configuration information.

The network interface 402 may function in conjunction with a secure channel manager to provide a secure channel for USB data transfers.

Securable peripheral device interface 450 includes an optional local processor 212 with USB management methods as described in FIG. 2. The local processor 212 may run a limited USB device driver and performs limited peripheral device enumeration in order to query device class and capabilities. Driver functions include managing device reset and initialization including and reading of device, configuration or subordinate descriptors. The local processor 212 may support full enumeration of low security risk input devices such as mouse or keyboard. In one embodiment, the local processor 212 establishes unsecured USB data connection 132 with the unprotected host system 460. A protocol such as RDP may be used to exchange USB data between the unprotected host system 460 and the AHC 204 with the support of USB drivers executed by the local processor 212. In the embodiment depicted, an optional authentication server 124 is also remotely located and connected to security module 208 across network connection 108 as previously shown.

In an alternative embodiment of securable peripheral device interface 450 includes policy enforcement structures that enable ongoing enforcement once devices have been authenticated.

The security module 208 uses policy enforcement techniques as described in FIG. 2, including device policy connection path 254 to the bridged OHC client module 400 and the audit information signal 252 to the descriptor filter 250. The bridged OHC client module 400 and the bridged OHC host module 406 include corresponding policy enforcement features described for the OHC 406.

Other embodiments of the invention are also contemplated. In one alternative, the switch 201 of FIG. 2 is released when user log-off is detected. One method of detecting a log off event is to monitor keyboard endpoint descriptor for specific key codes. Another technique provides an out-of-band signaling channel between the host system 100 and the security module 208. This technique requires additional host software driver functions.

Future device authentication may evolve to be more then basic USB device identification. For example, it may also include certificate authentication methods. In such cases, these evolutional methods are supported with the additional level of security described herein. The invention ensures that only the authorized devices are connected, which provides a more secure device identification technique.

While the foregoing is directed to embodiments of the present invention, other and further embodiments of the invention may be devised without departing from the basic scope thereof, and the scope thereof is determined by the claims that follow.

What is claimed is:

1. Apparatus for providing a securable peripheral data interface comprising:
   a connectivity control element coupled between an interface connector and an interface circuit; and
   an interface controller, coupled to the connectivity control element, for authenticating a peripheral device and controlling connectivity between the interface connector and the interface circuit based upon authentication of the peripheral device, wherein the interface controller comprises a first processor, independent from a second processor associated with the interface circuit, for performing out-of-band authentication of the peripheral device.

2. The apparatus of claim 1 wherein the interface circuit comprises a hub and the hub provides connectivity to a plurality of interface connectors through a respective plurality of connectivity control elements.

3. The apparatus of claim 1 wherein the interface controller comprises a hub and the hub provides connectivity to the plurality of interface connectors through the respective plurality of connectivity control elements.

4. The apparatus of claim 1 wherein the interface connector and the interface circuit are adapted to communicate with a universal serial bus peripheral device.

5. The apparatus of claim 4 wherein the interface connector comprises circuitry to drive and terminate the signals connected to the universal serial bus peripheral device.

6. The apparatus of claim 5 wherein the interface connector comprises circuitry to detect the disconnection of the peripheral device, wherein a disconnection event results in the connectivity control element connecting the interface connector to the interface controller.

7. The apparatus of claim 1 wherein the first processor performs device query operations on the peripheral device.

8. The apparatus of claim 1 wherein the interface circuit is bridged.

9. The apparatus of claim 1 further comprising an authentication server for providing authentication services to the interface controller.

10. The apparatus of claim 1 further comprising a descriptor filter for monitoring data, after peripheral device authentication, flowing through the interface circuit.

11. The apparatus of claim 10 wherein the descriptor filter monitors data in accordance with a predefined policy.

12. Apparatus for providing a securable peripheral data interface comprising:
   an interface connector for coupling to a peripheral device;
   a connectivity control element coupled to the interface connector;
   an interface circuit, communicatively coupled to a host CPU, being selectively coupled to the interface connector via the connectivity control element; and
   an interface controller, comprising a first processor independent of the host CPU, coupled to the connectivity control element, for performing out-of-band authentication of the peripheral device and controlling connectivity between the interface connector and the interface circuit based upon authentication of the peripheral device.

13. The apparatus of claim 12 wherein the interface circuit comprises elements of an operational host controller and the interface controller comprises an authentication controller.

14. The apparatus of claim 13 wherein the operational host controller is bridged between a host system and the securable peripheral data interface.

15. The apparatus of claim 12 further comprising a descriptor filter for monitoring data, after peripheral device authentication, flowing through the interface circuit.

16. The apparatus of claim 15 wherein the descriptor filter monitors data in accordance with a predefined policy.

17. A method of providing a securable peripheral data interface comprising:
   generating an indicia of authenticity for a peripheral device using an out-of-band interface controller, wherein generating the indicia of authenticity comprises authenticating the peripheral device in accordance with an authentication policy; and
   coupling, in response to the indicia of authenticity, an interface connector to an interface circuit.

18. The method of claim 17 wherein the interface connector is associated with the peripheral device.

19. The method of claim 17 wherein the generating step comprises sensing a connection of a peripheral device to the interface connector.

20. The method of claim 17 wherein the generating step comprises querying the peripheral device.

21. The method of claim 17 further comprising monitoring signals flowing through the interface circuit and decoupling the interface circuit from the interface connector in response to the monitored signals.

22. The method of claim 17 wherein the coupling step is performed using a bridged interface circuit.

23. The method of claim 17 further comprising, in response to detecting the disconnection of the peripheral device, decoupling the interface connector from the interface circuit.

24. The method of claim 23 further comprising, in response to detecting the disconnection of the peripheral device, coupling the interface connector to the out-of-band interface controller.

* * * * *